United States Patent [19]
Pang

[11] Patent Number: 6,061,053
[45] Date of Patent: May 9, 2000

[54] AUTOMATIC GAIN CONTROL DEVICE OF AN LCD PROJECTOR FOR CONVERTING ANALOG COLOR SIGNALS

[75] Inventor: Chien Cheng Pang, Hsin-Chu, Taiwan

[73] Assignee: Mustek System Inc., Hsin-Chu, Taiwan

[21] Appl. No.: 09/089,933

[22] Filed: Jun. 3, 1998

[51] Int. Cl.$^7$ .............................. G06F 3/00; G06F 13/00; G09G 5/00

[52] U.S. Cl. ............................................................ 345/204

[58] Field of Search .............................. 345/204; 341/139, 341/132, 118

[56] References Cited

U.S. PATENT DOCUMENTS 5,210,538   5/1993   Kuroiwa .................................. 341/160

Primary Examiner—Richard A. Hjerpe
Assistant Examiner—Kevin M. Nguyen
Attorney, Agent, or Firm—Winston Hsu

[57] ABSTRACT

The present invention provides an AGC (automatic gain control) device used in a displaying device such as an LCD projector for converting an analog color signal generated by a VGA card into a digital color signal. The AGC device comprises an A/D converter for converting the analog color signal into the digital color signal according to an upper reference voltage and a lower reference voltage, generating an overflow signal when the voltage of the analog color signal exceeds the upper reference voltage, and generating an underflow signal when the voltage of the analog color signal is below the lower reference voltage; and a feedback circuit for generating the upper and lower reference voltages. When receiving the overflow or underflow signal, the feedback circuit will increase the upper reference voltage or decrease the lower reference voltage so as to allow the A/D converter to completely convert the analog color signal into the digital color signal.

11 Claims, 4 Drawing Sheets

AUTOMATIC GAIN CONTROL DEVICE OF AN LCD PROJECTOR FOR CONVERTING ANALOG COLOR SIGNALS

BACKGROUND OF THE INVENTION

1. Field of the Invention

The present invention relates to an LCD projector, and more particularly, to an automatic gain control device of an LCD projector for converting an analog color signal received from a VGA card to a digital color signal.

2. Description of the Prior Art

LCD (liquid crystal display) projectors are frequently used for displaying RGB signals generated by a VGA card of a personal computer. Because RGB signals generated by different VGA cards have different voltage amplitudes, the RGB signals displayed by an LCD projector may appear differently when the RGB signals displayed by the LCD projector are generated by different VGA cards.

A prior art video AGC (automatic gain control) circuit used in many displaying devices can be used to adjust composite video signals which contain a reference signal related to the voltage amplitude of each video signal. But it can not be used to adjust RGB signals generated from VGA cards because these RGB signals do not have reference signals. Please refer to FIG. 1 and FIG. 2. FIG. 1 shows a composite video signal 10. FIG. 2 shows two analog RGB signals 20 generated by a VGA card. The composite video signal 10 comprises a brightness synchronization signal 12, a chromatic synchronization signal 14 (3.58 MHz), and an analog color signal 16. The amplitude of the brightness synchronization signal 12 is proportional to the amplitude of the analog color signal 16. The brightness synchronization signal 12 is used by a prior art video AGC device as a reference signal so that the analog color signal 16 can be completely converted into a digital color signal. The analog RGB signals 20 generated by a VGA card do not have such brightness synchronization signals, and thus cannot be adjusted by using prior art video AGC devices.

SUMMARY OF THE INVENTION

It is therefore a primary objective of the present invention to provide an AGC device for a displaying device such as an LCD projector to solve the above mentioned problem.

In a preferred embodiment, the present invention provides an AGC device of a displaying device such as an LCD projector for converting an analog color signal received from a VGA (video graphic array) card into a digital color signal. The AGC device comprises an A/D (analog to digital) converter for converting the analog color signal into the digital color signal according to an upper reference voltage and a lower reference voltage, generating an overflow signal when the voltage of the analog color signal exceeds the upper reference voltage, and generating an underflow signal when the voltage of the analog color signal is below the lower reference voltage; and a feedback circuit for generating the upper and lower reference voltages. When receiving the overflow or underflow signal, the feedback circuit will increase the upper reference voltage or decrease the lower reference voltage so as to allow the A/D converter to completely convert the analog color signal into the digital color signal.

It is an advantage of the present invention that the AGC device of the displaying device can adjust the upper and lower reference voltages according to the amplitude of the analog color signal so that the A/D converter can completely convert the analog color signal into the digital color signal.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 1:
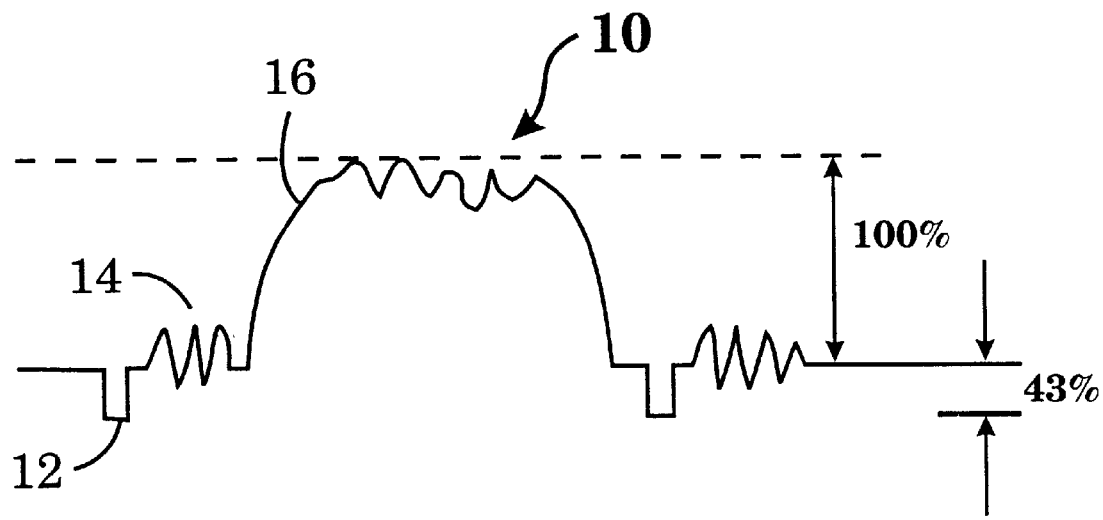
FIG. 1 is a composite video signal.
Figure 2:
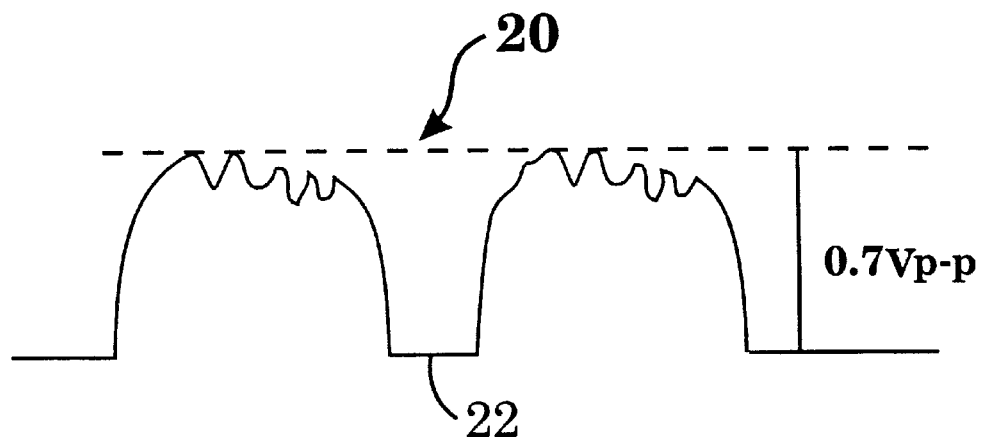
FIG. 2 are two analog RGB signals generated by a VGA card.
Figure 3:
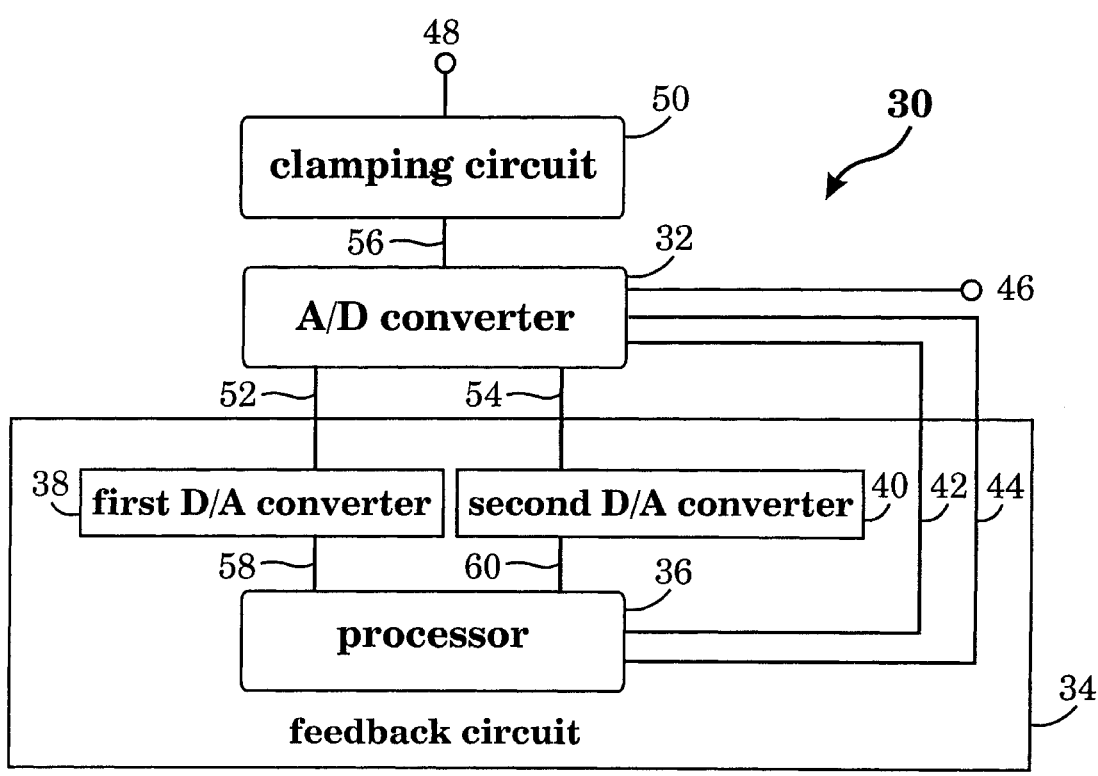
FIG. 3 is a function block diagram of an AGC device used in a displaying device according to the present invention.

Please refer to FIG. 3. FIG. 3 is a function block diagram of an AGC device 30 used in a displaying device according to the present invention. The AGC device 30 comprises a clamping circuit 50, an A/D (analog to digital) converter 32, and a feedback circuit 34.

The clamping circuit 50 is used for clamping a bottom level 22 of an analog color signal 20 received from the input port 48 to a predetermined base voltage. The A/D converter 32 is used for converting the clamped analog color signal 20 inputted from port 56 of the clamping circuit 50, into a digital color signal over port 46, according to an upper reference voltage at the port 52 and a lower reference voltage at the port 54. When the voltage level of the analog color signal is higher than the upper reference voltage, the A/D converter 32 will generate an overflow signal over port 42. And if the voltage of the analog color signal is lower than the lower reference voltage, the A/D converter 32 will generate an underflow signal over port 44.

The feedback circuit 34 is used for generating the upper reference voltage and the lower reference voltage over ports 52 and 54 for the A/D converter 32. It will increase the upper reference voltage over port 52 when receiving the overflow signal from the A/D converter 32, and decrease the lower reference voltage over port 54 when receiving the underflow signal from the A/D converter 32 so that eventually the analog color signal received from a VGA card can be completely converted into a digital color signal.

The feedback circuit 34 comprises a processor 36, a first D/A (digital to analog) converter 38, and a second D/A converter 40. The processor 36 is used for receiving the overflow signal from port 42 and the underflow signal from port 44, and generating an upper digital signal over port 58 and a lower digital signal over port 60. The first D/A converter 38 is used for converting the upper digital signal generated by the processor 36 at port 58 into an upper reference voltage over port 52. The second D/A converter 40 is used for converting the lower digital signal generated by the processor 36 at port 60 into a lower reference voltage over port 54.

When the AGC device 30 is initiated, the clamping circuit 50 will clamp a bottom level of an analog color signal generated by a VGA card to a predetermined base voltage, and the feedback circuit 34 will output an initial upper reference voltage over port 52 and an initial lower reference voltage over port 54 for converting the analog color signal received from port 56 of the clamping circuit 50. The initial upper and lower reference voltages are generated by the feedback circuit 34 according to the base voltage of the clamping circuit 50. The difference between the initial upper and lower reference voltages is less than an average amplitude of the analog color signal generated by the VGA card. When the AGC device 30 starts converting the analog color signal inputted from port 56 of the clamping circuit 50, the feedback circuit 34 will continuously adjust its upper and lower reference voltages over ports 52 and 54 according to the overflow and underflow signals generated by the A/D converter 32 until the analog color signal can be completely converted into a digital color signal according to the final upper and lower reference voltages.

The AGC device 30 shown in FIG. 3 is used for converting one analog color signal generated by a VGA card. But a color VGA card usually generates three analog color signals (red, green and blue) concurrently. If three analog color signals are to be converted by the AGC device 30 concurrently, three clamping circuits 50 are required to fix the three analog color signals to a base voltage and three A/D converters 32 are also required for converting the three clamped analog color signals. The feedback circuit 34 can be shared by the three A/D converters 32 to control their individual upper and lower reference voltages in the same time.

Figure 4:
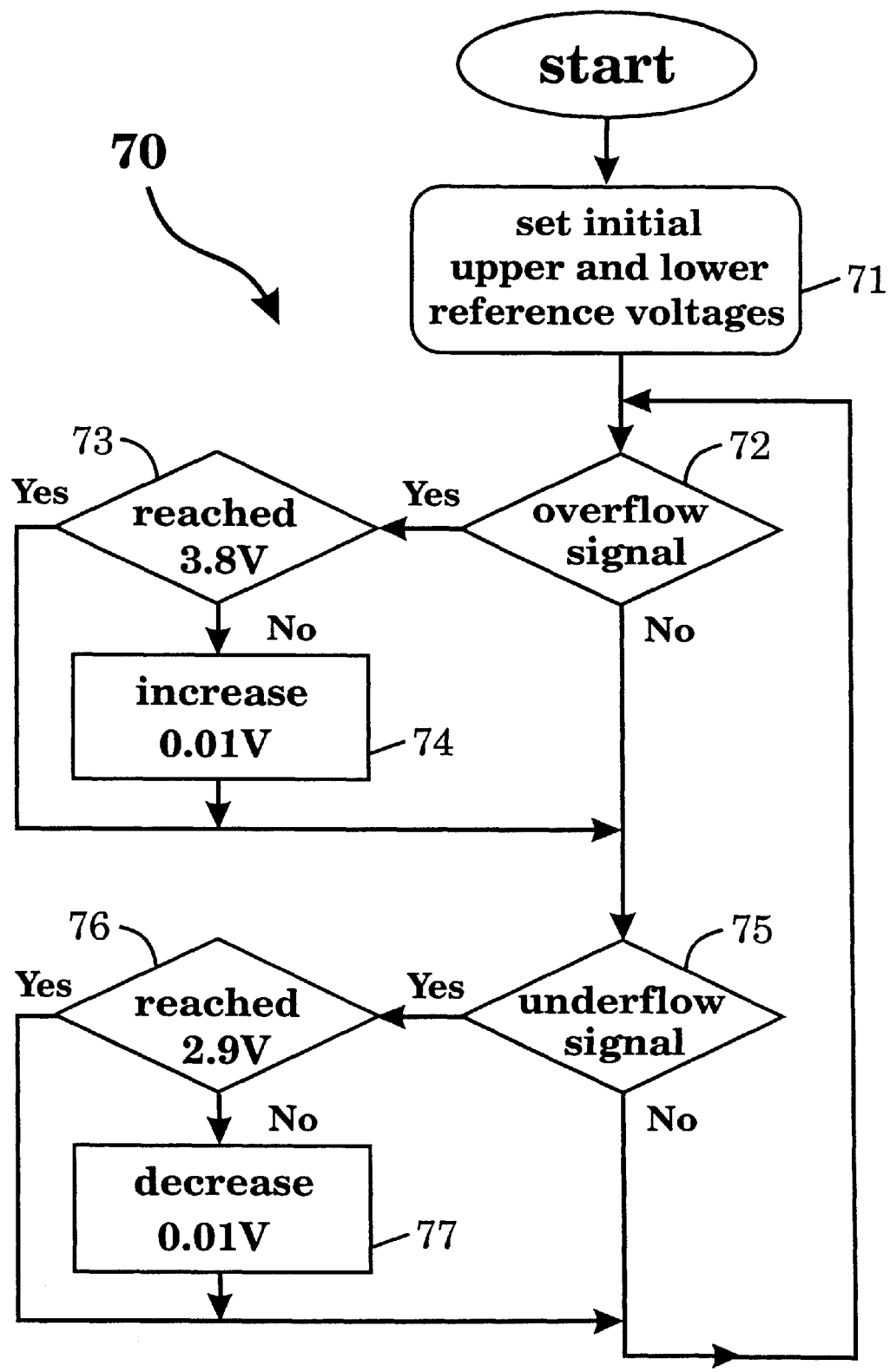
FIG. 4 shows a process for adjusting the upper and lower reference voltages by using the processor shown in FIG. 3.

Please refer to FIG. 4. FIG. 4 is a process 70 for adjusting the upper and lower reference voltages by using the processor 36. It is assumed that the clamping circuit 50 has clamped a bottom level of an analog color signal received from a VGA card to 2.95 V. The process 70 comprises the following steps:

Step 71: setting initial upper and lower reference voltages over ports 52 and 54 to 3.5 V and 3.0 V;

Step 72: checking if there is any overflow signal; if not, go to step 75;

Step 73: checking if the upper reference voltage has reached an upper limit such as 3.8 V; if yes, go to step 75;

Step 74 increasing the upper reference voltage one voltage level such as 0.01 V;

Step 75 checking if there is any underflow signal; if not, go to step 72;

Step 76 checking if the lower reference voltage has reached a lower limit such as 2.9 V; if yes, go to step 72;

Step 77 decreasing the lower reference voltage one voltage level such as 0.01 V; go to step 72.

Figure 5:
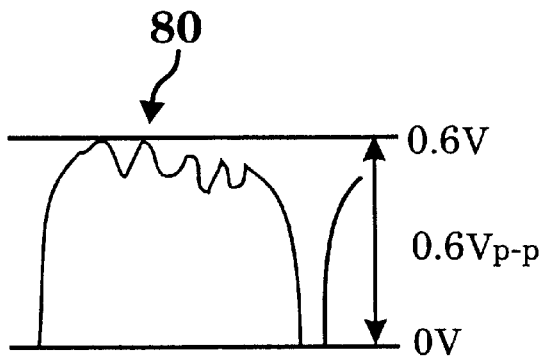
FIG. 5 shows an analog color signal generated by a VGA card which is to be fed into the clamping circuit shown in FIG. 3.
Figure 6:
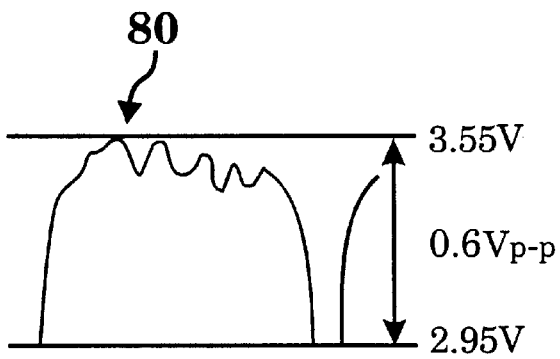
FIG. 6 shows an analog color signal generated by the clamping circuit.

The process 70 can be illustrated by using the example shown in FIGS. 5 to 8. Please refer to FIGS. 5 and 6. FIG. 5 shows an analog color signal 80 generated by a VGA card which is to be fed into the clamping circuit 50. FIG. 6 is a clamped analog color signal 80 generated by the clamping circuit 50 over port 56. FIG. 5 shows that the amplitude of the signal 80 is 0.6 $V_{p-p}$. After the signal 80 is clamped by the clamping circuit 50, its upper and lower voltage levels become 3.55 V and 2.95 V. If the upper and lower reference voltages generated over ports 52 and 54 by the feedback circuit 34 can be set to 3.55 V and 2.95 V, the signal 80 will be completely converted by the A/D converter 32 into a digital color signal without any lost.

Figure 7:
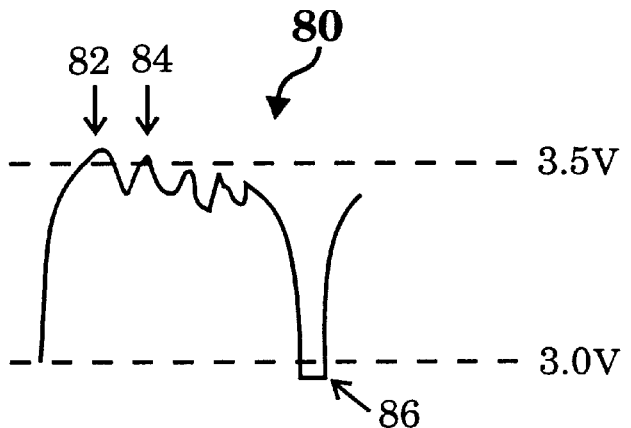
FIGS. 7 and 8 show a process for adjusting the upper and lower reference voltages according to the amplitude of the analog color signal shown in FIG. 5.
Figure 8:
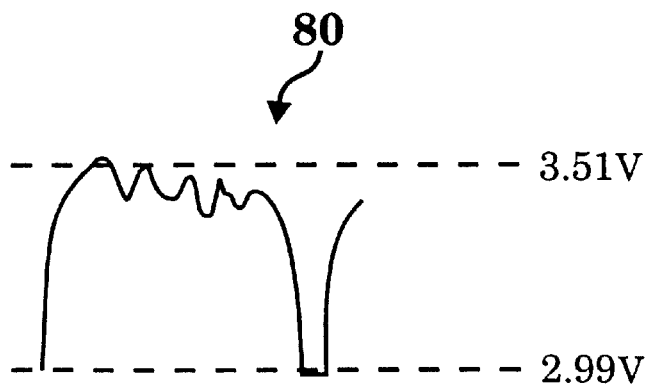

Please refer to FIGS. 7 and 8. FIGS. 7 and 8 show a process for adjusting the upper and lower reference voltages by using the feedback circuit 34. FIG. 7 shows that the initial upper reference voltage of the feedback circuit 34 is 3.5 V, and the initial lower reference voltage is 3.0 V. Since the voltage levels over sections 82 and 84 of the signal 80 exceed 3.5 V, and the voltage level over section 86 is below 3.0 V, the A/D converter 32 will generate an overflow signal when converting the sections 82 and 84 of the signal 80, and an underflow signal when converting the section 86 of the signal 80. When received the overflow and underflow signals, the feedback circuit 34 will adjust its upper and lower reference voltages instantly. FIG. 8 shows that the feedback circuit 34 raises its upper reference voltage to 3.51 V, and lowers its lower reference voltage to 2.99 V. After repeated adjustments, the upper and lower voltage levels of an analog color signal received from a VGA card will eventually fall within the upper and lower reference voltages, and thus the A/D converter 32 can completely convert the analog color signal 80 into the digital color signal.

Those skilled in the art will readily observe that numerous modifications and alternations of the device may be made while retaining the teachings of the invention. Accordingly, the above disclosure should be construed as limited only by the metes and bounds of the appended claims.

What is claimed is:

1. An AGC (automatic gain control) device of a displaying device for converting an analog color signal received from a VGA (video graphic array) card into a digital color signal, the AGC device comprising:

an A/D (analog to digital) converter for converting the analog color signal into the digital color signal according to an upper reference voltage and a lower reference voltage, and generating an overflow signal when the voltage of the analog color signal exceeds the upper reference voltage; and a feedback circuit for generating the upper and lower reference voltages;

wherein when receiving the overflow signal, the feedback circuit will increase the upper reference voltage so as to allow the A/D converter to completely convert the analog color signal into the digital color signal.

2. The AGC device of claim 1 wherein the A/D converter generates an underflow signal when the voltage of the analog color signal is below the lower reference voltage, and when receiving the underflow signal, the feedback circuit decreases the lower reference voltage so as to allow the A/D converter to completely convert the analog color signal into the digital color signal.

3. The AGC device of claim 2 wherein when the AGC device is initiated, the feedback circuit will output an initial upper reference voltage and an initial lower reference voltage so that the A/D converter can start converting the analog color signal.

4. The AGC device of claim 3 further comprising a clamping circuit connected between the VGA card and the A/D converter for clamping the analog color signal to a base voltage wherein the initial upper and lower reference voltages are generated by the feedback circuit according to the base voltage of the clamping circuit.

5. The AGC device of claim 2 wherein the feedback circuit comprises:

a processor for receiving the overflow and underflow signals generated by the A/D converter, and generating an upper digital signal and a lower digital signal;

a first D/A (digital to analog) converter for converting the upper digital signal to the upper reference voltage; and a second D/A converter for converting the lower digital signal to the lower reference voltage.

6. The AGC device of claim 5 wherein when receiving the overflow signal, the processor increases the upper digital signal to raise the upper reference voltage, and when receiving the underflow signal, the processor decreases the lower digital signal to lower the lower reference voltage.

7. The AGC device of claim 5 wherein when the AGC device is initiated, the processor outputs an initial upper digital signal and an initial lower digital signal for generating an initial upper reference voltage and an initial lower reference voltage so that the A/D converter can start converting the analog color signal.

8. The AGC device of claim 1 wherein the analog color signal generated by the VGA card can be a red, green or blue signal.

9. The AGC device of claim 1 wherein the displaying device is an LCD (liquid crystal display) projector.

10. An AGC method used in a displaying device for converting an analog color signal generated by a VGA card into a digital color signal, the AGC method comprising:

utilizing an A/D converter to convert the analog color signal into the digital color signal according to an upper reference voltage and a lower reference voltage, and to generate an overflow signal when the voltage of the analog color signal exceeds the upper reference voltage;

utilizing a feedback circuit to generate the upper reference voltage and the lower reference voltage; and utilizing the feedback circuit to increase the upper reference voltage when receiving the overflow signal so as to allow the A/D converter to completely convert the analog color signal into the digital color signal.

11. The AGC method of claim 10 wherein the A/D converter generates an underflow signal when the voltage of the analog color signal is below the lower reference voltage, and the AGC method further comprises:

utilizing the feedback circuit to decrease the lower reference voltage when receiving the underflow signal so as to allow the A/D converter to completely convert the analog color signal into the digital color signal.

* * * * *